United States Patent [19]

O'Farrell

[11] Patent Number: 5,151,824
[45] Date of Patent: Sep. 29, 1992

[54] VEHICULAR OUTSIDE MIRROR ASSEMBLY

[75] Inventor: Desmond J. O'Farrell, Holland, Mich.

[73] Assignee: Donnelly Corporation, Holland, Mich.

[21] Appl. No.: 618,169

[22] Filed: Nov. 26, 1990

[51] Int. Cl.⁵ .............................................. G02B 17/00
[52] U.S. Cl. .................................. 359/604; 359/514; 359/841
[58] Field of Search .............. 359/601, 602, 603, 604, 359/609, 507, 513, 514, 841, 842; 296/97.1, 97.2

[56] References Cited

U.S. PATENT DOCUMENTS

| | | |
|---|---|---|
| 2,495,347 | 1/1950 | Ritz-Woller . |
| 3,081,672 | 3/1963 | Anderson . |
| 3,259,017 | 7/1966 | Faulhaber ............................ 359/603 |
| 4,721,364 | 1/1988 | Itoh et al. ............................ 359/602 |

FOREIGN PATENT DOCUMENTS

| | | |
|---|---|---|
| 1068572 | 11/1959 | Fed. Rep. of Germany . |
| 843050 | 6/1939 | France . |
| 2254456 | 11/1975 | France . |
| 62-15052 | 1/1987 | Japan . |
| 1125846 | 9/1968 | United Kingdom . |
| 1441866 | 7/1976 | United Kingdom . |

*Primary Examiner*—Loha Ben
*Attorney, Agent, or Firm*—Price, Heneveld, Cooper, DeWitt & Litton

[57] ABSTRACT

A rearview mirror for vehicles especially adapted for exterior vehicle use with electro-optic/electrochromic mirror units includes a reflective mirror element and a surrounding bezel having a raised edge or crown. The raised crown provides an appearance of narrowness and reduced bezel size. The bezel is preferably also thinner at the sides of the mirror than at the top or bottom and includes a rear retaining member which resiliently traps the mirror between a pair of resilient compressible seal members to form a continuous pocket at the edge of the mirror which is sealed against humidity, dirt, water, salt spray and other environmental effects commonly encountered by vehicles. Opposite polarity electrical connections for the electro-optic mirror unit are provided in different sizes or are mounted in different directions to prevent incorrect polarity connections to the vehicle electrical system.

35 Claims, 5 Drawing Sheets

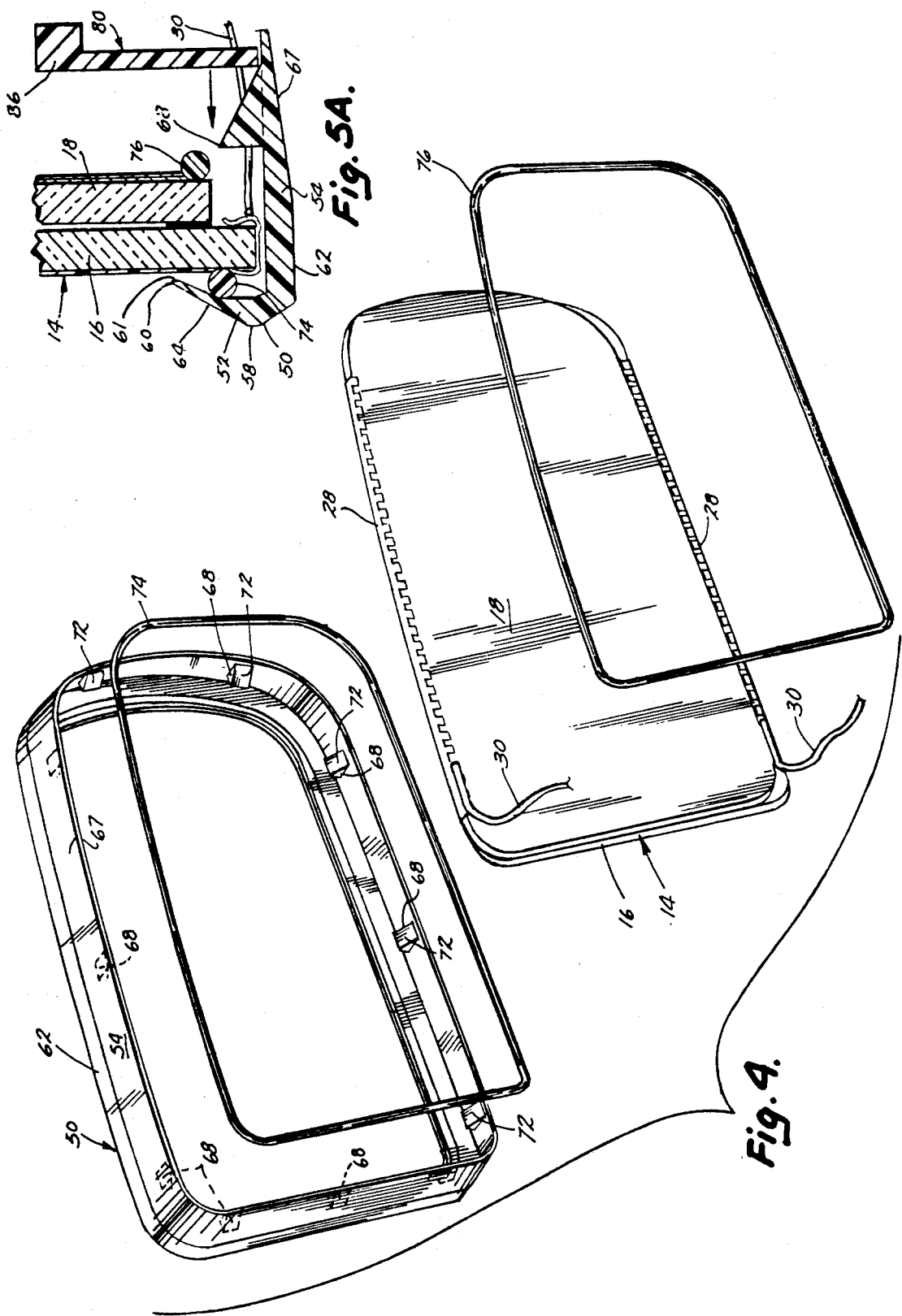

VEHICULAR OUTSIDE MIRROR ASSEMBLY

BACKGROUND OF THE INVENTION

This invention relates to rearview mirrors for vehicles and, more particularly, to a mounting assembly for outside mirrors which protects the mirror unit and improves appearance while minimizing cost and simplifying manufacturing operations.

In recent years, electro-optic rearview mirror assemblies for both interior and exterior vehicular applications have become popular. These mirrors include an electrically responsive material or medium which destructs incident light to reduce reflected light and glare. A typical electro-optic mirror unit includes a pair of glass or other optically clear panels, an electro-optic medium between the panels, electrical means for applying electric power to the electro-optic medium to vary the light transmittance through the medium, and a reflective layer for reflecting light through the medium which is incident on the mirror. Because of such construction, these units are larger, thicker and require more space than conventional mirrors. This is especially true at the peripheral edges of the mirror to allow for electrical connections from the vehicle electrical system. Consequently, in the past, such units have been mounted on the vehicle in larger, thicker, bulkier mounting frames which are often unappealing in appearance.

In addition, these electro-optic mirror units are more sensitive than conventional mirrors to environmental effects, especially at their edges where high humidity and/or salt spray can cause corrosion or severely degrade the reflective metal layers in the unit and/or short out and disrupt electrical operation preventing proper dimming and/or glare reduction Such units are also electrical polarity sensitive. Hence, improper connection to reverse polarity electrical sources can damage or destroy the operation of the units.

Additional problems encountered with such electro-optic rearview mirrors include the destruction or damage due to vibration or breakage during shipment, greater complexity in manufacturing operations and consequent greater assembly cost, and difficulty in servicing such units including removal and replacement of the electro-optic units.

Prior known mounting frames for electro-optic rearview mirrors have failed to address or solve these and related electro-optic rearview mirror problems For example, Japanese Utility Model Patent Publication 62-15052 discloses a mirror mounting assembly including a two-part rim which is fastened around the peripheral edge of the mirror unit and incorporates rubber or foam between the rim parts as a cushion for compressive forces acting generally parallel to the plane of the mirror unit. However, such mounting structure fails to address numerous other problems as described above including protection from numerous types of environmental effects, prevention of improper polarity connections to the vehicle electrical system, accommodation of mirror serviceability such as mirror removal and replacement, and minimization of bulk and size for improved appearance.

The present invention was developed in recognition of and as a solution for these and other problems

SUMMARY OF THE INVENTION

Accordingly, the present invention provides a rearview mirror assembly for vehicles, especially for the exterior of vehicles, which is uniquely adapted to receive electro-optic/electrochromic mirror units, provide effective protection against environmental effects and vibration both during shipment and after installation on the vehicle, as well as protection against incorrect polarity connections to the vehicle electrical system. In addition, the assembly has an improved size-minimizing appearance which creates the impression of small dimensions. Further, the assembly uniquely accommodates serviceability by allowing ease in removal and replacement of the electro-optic units with minimal difficulty and cost.

In one aspect, the invention is a rearview mirror assembly for vehicles comprising a rearview mirror having a mirror element with front and rear surfaces and peripheral top, bottom and opposing end edges as well as a reflective coating on one of the front or rear surfaces. A bezel which surrounds and holds the mirror has a rim engaging the front surface of the mirror, a peripheral side adjacent the peripheral edges of the mirror, and means for holding the mirror within the bezel. Mounting means are provided for connection to a mirror support. The bezel rim includes a crown extending around the entire bezel and an inner edge engaging the front of the mirror. The crown is spaced inwardly toward the inner edge from the peripheral side and divides the rim into an inner surface sloping from the crown to the inner edge and a lateral surface sloping from the crown toward the peripheral side of the bezel. Thus, when viewed from the front of the mirror at an angle, such as the angle at which the mirror is viewed by the driver or those outside the vehicle, the bezel appears thinner than its full width due to light accenting the crown and deemphasizing the inner rim surface.

In other aspects, the invention includes a bezel having a rim with a first width along the front mirror surface adjacent the top and bottom edges a second, smaller width along the opposing end edges of the mirror which is less than the first width. When viewed at an angle from the front and adjacent one end, such bezel rim appears smaller at the end edges of the mirror thereby deemphasizing the size and appearance of the bezel on the assembly. This bezel having differential width rim portions at the sides versus the top and bottom of the mirror may be combined with the crown which extends around the entire bezel for deemphasizing the inner rim surface.

In yet another aspect of the invention, the bezel which surrounds the mirror has a rim engaging the front surface of the mirror and a peripheral side adjacent the peripheral edge surface of the mirror. A retaining member adjacent the rear surface of the mirror engages the bezel to hold the mirror within the bezel. Cooperating means on the bezel and retaining member hold the retaining member and bezel together while mounting means are provided for connection to a mirror support. Seal means within the bezel and retaining member seal the peripheral edge of the mirror. The seal means include a first resilient compressible seal member extending around the entirety of the mirror adjacent the mirror periphery and intermediate the rim inner surface and the mirror front surface. A second resilient compressible seal member extends around the entirety of the mirror adjacent the mirror periphery and intermediate the retaining member and the mirror rear surface. These seal members and the imperforate peripheral side of the bezel define a generally open pocket adjacent the peripheral mirror edge which is sealed environmentally to protect the peripheral mirror edge including the reflective coating against environmental effects such as water, dirt, salt spray, humidity, corrosion and the like. Further, the first seal resiliently urges the mirror rearwardly against the second seal member to ensure a secure environmental seal and hold the mirror tightly and cushion the mirror against vibration and shock.

In other aspects of the invention, the rearview mirror assembly accommodates an electro-optic mirror unit including a pair of electrical connections to the electro-optic mirror, a bezel surrounding and holding the mirror unit, and mounting means for connection to a mirror support. The bezel includes a support for mounting the pair of electrical connections for connection to a vehicle electrical system. The pair of electrical connections has opposite polarities and includes means for preventing incorrect polarity connections from the vehicle electrical system. In one form, the means for preventing incorrect polarity connections include mounting the electrical connections to extend in different directions so as to mate with corresponding vehicle connections of the same polarity on electrical leads having different lengths. In another form, the pair of electrical connections each has a different size/dimension adapted to mate with a correspondingly sized connection of the same polarity from the vehicle electrical system.

The present invention, therefore, provides a mounting structure especially adapted to receive electro-optic/electrochromic mirror units which have larger sizes, thicknesses and greater space needs at their edges for electrical connections. The assembly provides an improved appearance which minimizes the appearance of the mounting bezel and creates the impression of small dimensions, especially when viewed at an angle from either inside or outside the vehicle on which it is mounted. Further, the invention provides improved protection for electro-optic/electrochromic units, especially when mounted on the outside of a vehicle, against the effects of the environment such as dirt, humidity, corrosion, salt spray, water and the like which can physically degrade the electro-optic units as well as short out or disrupt electrical operation thereof. The invention also protects the electro-optic mirrors from vibration and shock both during shipment and after installation on a vehicle. Also, the invention accommodates serviceability by allowing easier removal and replacement of the electro-optic mirror units thereby minimizing costs. In addition, destruction and damage of the electro-optic mirror units is avoided through inclusion of electrical connections which prevent incorrect polarity connections to the vehicle electrical system.

These and other objects, advantages, purposes and features of the invention will become more apparent from a study of the following description taken in conjunction with the drawings.

BRIEF DESCRIPTION OF THE DRAWINGS

FIG. 4 is an exploded, perspective view of the mirror assembly of FIGS. 1-3 illustrating a portion of the separate components of the assembly;

FIG. 5A is a fragmentary, sectional view of the mirror assembly of FIGS. 1-5 similar to FIG. 5 but illustrating the assembly process prior to completion;

DESCRIPTION OF THE PREFERRED EMBODIMENTS

Figure 1:
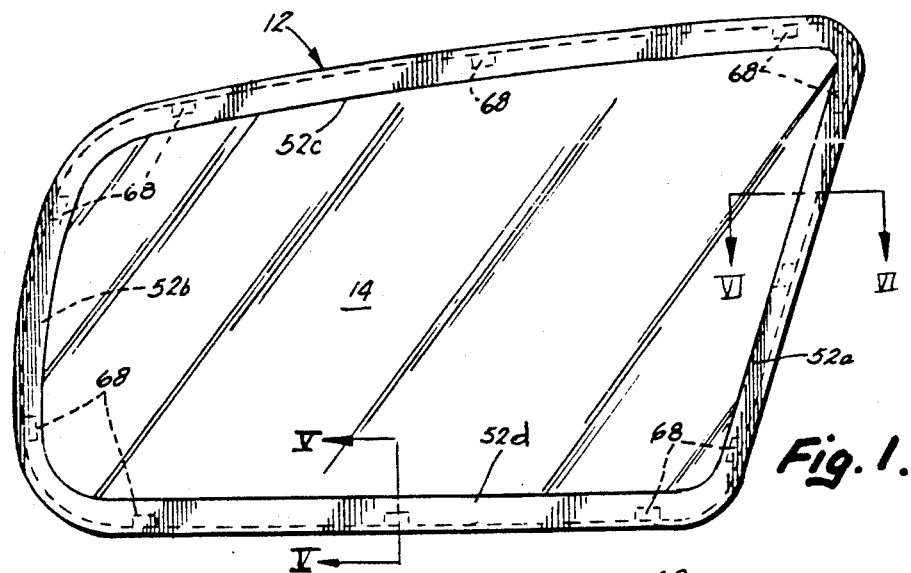
FIG. 1 is a front elevation of a rearview mirror assembly incorporating the present invention.

Referring now to the drawings in greater detail, FIGS. 1-13 illustrate a first embodiment 10 of an exterior rearview mirror assembly for vehicles incorporating the present invention. The mirror assembly 10 includes a bezel 12 surrounding, engaging and holding the peripheral edge of a rearview mirror unit 14 preferably of the electro-optic type. Mirror unit 14 includes electrical connections adapted to be joined to the vehicle electrical system to provide a small voltage source of electrical power. Alternately, a heating pad or element 152 as described below may be applied to the rear surface of the mirror unit 14 to defrost/de-ice the mirror assembly when used in colder climates.

With reference to FIGS. 1, 2, 4 and 5, the electro-optic mirror unit 14 is preferably of the type having a first or front, optically clear, mirror element 16 and a second or rear, optically clear, mirror element 18. Element 18 is spaced slightly rearwardly from front element 16 to define a gap or space 20 for receiving an electro-optic medium 22 as explained below. Preferably, front and rear elements 16, 18 are each formed from a generally planar sheet of conventional soda lime window glass. Alternately, elements 16, 18 may be resinous, polymeric sheets to help prevent fragment scattering and lacerative injuries if broken and also to reduce weight Elements 16, 18 are cut to the shape of a conventional outside vehicular mirror as shown in FIG. 1, although other shapes are certainly possible. Space 20 is formed between the parallel rear surface 24 of front glass element 16 and the forward facing front surface 26 of rear glass element 18. Preferably, each of the front and rear surfaces 24, 26 is coated with a layer of indium-tin oxide (ITO) which is substantially transparent to incident visible light yet is sufficiently electrically conductive to enable application of an electric field or voltage across space 20 between the ITO layers.

Figure 5:
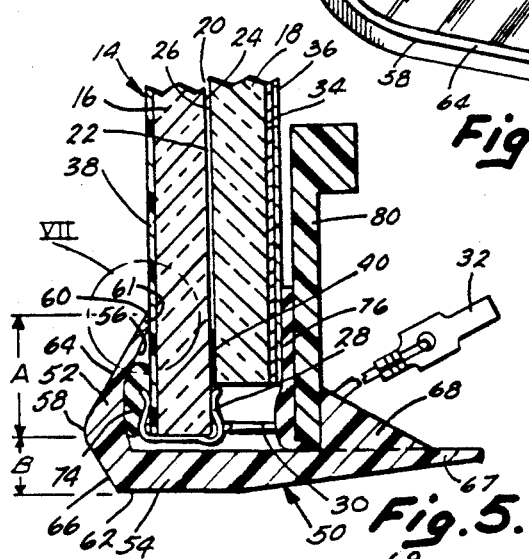
FIG. 5 is a fragmentary sectional view of the mirror assembly taken along Plane V—V of FIG. 1.

As shown in FIG. 5, elements 16 and 18 are preferably offset vertically from one another such that the lower edge of front element 16 projects below the lower edge of rear element 18 along the bottom of the mirror unit while the upper edge of element 18 projects above the upper edge of element 16 along the top of the mirror unit. The downwardly and upwardly projecting edges of the elements 16, 18 receive elongated, terminals or metal clips 28 which are preferably formed from bent copper sheet and are crimped around the extending lower and upper edges of these elements. Consequently, the ITO coated surface of each element 16, 18 is firmly contacted by a separate one of the cups 28. Wire leads 30 are soldered to clips 28 (FIGS. 4 and 5) and extend rearwardly from the electro-optical mirror unit 14 for connection to spay-type electrical connectors 32 for ultimate connection to the vehicle electrical system. Other types of electrical connections from the vehicle electrical system different from cups 28 may be joined to the mirror unit as described in co-pending, commonly assigned U.S. Pat. application Ser. No. 454,398, filed Dec. 21, 1989, now U.S. Pat. No. 5,066,112, entitled "PERIMETER COATED, ELECTRO-OPTIC MIRROR", the disclosure of which is hereby incorporated by reference herein.

The rear surface of rear glass element 18 is preferably coated with a reflective layer 34 of metallic material such as aluminum, or a combination of silver and copper as is conventionally known. Such layer provides a highly specular surface which reflects approximately 80% to 90% of the light incident thereon through front and rear glass elements 16, 18 and electro-optic medium 22 in space 20. In order to prevent scattering of glass fragments from the rear glass element 18 in the event of breakage or damage during a collision in the vehicle, a layer 36 of tape or a plastisol-type plastic adhesive, or an adhesive coated metal foil, typically about 0.1 mm thick, is applied to the rear surface of reflective coating 34. Anti-scattering layer 36 may be opaque, translucent or transparent since it is behind reflective coating 34 and need not transmit or reflect any light. In addition, the front surface of front element 16 may be scatter and antilacerative protected with a resinous, polymeric or other coated or applied layer 38 o its first or front surface. Layer 38 also preferably reduces ultraviolet light radiation into the assembly to prolong the operative life of the electro-optic medium 22. Alternately, or in combination with layer 38, other scatter preventing means such as a laminate first element, and additional UV protection may be included as described in co-pending, commonly assigned, U.S. Pat. applications Ser. No. 496,271, filed Mar. 20, 1990, now U.S. Pat. No. 5,073,012, entitled "ANTI-SCATTER, ULTRAVIOLET PROTECTED, ANTI-MISTING, ELECTRO-OPTIC ASSEMBLIES", and Ser. No. 464,888, filed Jan. 16, 1990, now U.S. Pat. No. 5,115,346, entitled "ANTI-SCATTER, ULTRAVIOLET PROTECTED, ANTI-MISTING, ELECTRO-OPTICAL REARVIEW MIRROR", the disclosures of which are hereby incorporated by reference herein.

In order to confine and retain the electro-optic medium 22 in gap 20, a peripheral seal 40, preferably formed from an epoxy material which adheres well to the ITO coatings on surfaces 24, 26 on elements 16, 18 is applied adjacent the periphery of the glass elements. A suitable epoxy sealing material is EPON 828 (T.M.) from Shell Chemical Company of Houston, Tex., cured by a polyamide based curing agent such as V-40 (T.M.) from Miller Stevenson Company of Danbury, Conn. The epoxy is preferably silk screened onto the inner surface of front glass element 16, or rear glass element 18, or both glass elements. The corresponding glass element is then placed face to face with the still, tacky epoxy. Seal 40 is then fully cured, typically by placing the assembly in an oven at 110° C. for three hours. Gap 20 can be filled by a variety of means such as a simple injection of electro-optically active liquid, semi-liquid or gel material using a syringe or by vacuum back filling using a technique well established for manufacture of liquid crystal devices.

Typically, glass elements 16, 18 will each be 2 mm in thickness while ITO coatings 24, 26 will have a typical thickness of 1,500 angstroms. Reflective coating 34 may have a thickness within the range of between about 500 and 1,000 angstroms. Various types of electro-optic media 22 may be inserted in gap 20. For example, a suitable liquid crystal material in which molecules are oriented to block the passage of light therethrough when an electric field is applied is a guest host die such as D5 (T.M.) produced by BDH Co. of Dorset, England, dissolved in n-type nematic liquid crystal such as n-(p-methoxybenzilidene)-p'-butylaniline. For such material, cell gap 20 is typically 8 to 12 microns. For electrochemichromic mirrors, gap 20 may contain a liquid, thickened liquid, gel or semi-solid material such as formulations described in U.S. Pat. No. 3,506,229 to Schoot. In electrochromic mirrors, a material such as poly-AMPS (T.M.) available from Lubrizol Corp. of Wickliffe, Ohio may be used. Also, a liquid, thickened liquid, gel or semi-solid material may be used as is conventionally known. Cell gap or space 20 is typically 50 to 150 microns in these electrochromic or electrochemichromic devices. With the latter materials, application of an electric field will cause the medium 22 to color to successively darker colors or shades as larger voltages are applied. When voltage is turned off or reversed, the coloring is bleached allowing full transmittance of light and, hence, full reflectivity of reflective layer 34.

With reference to FIGS. 1–6, bezel 12 includes a one piece bezel frame 50 preferably molded from "Noryl" (T.M.) poly-phenyl-oxide available from G.E. Plastics of Pittsfield, Mass., which extends around the entire periphery of the rearview mirror unit 14 and includes a front rim portion 52 extending inwardly toward the center of the mirror unit and a peripheral side portion 54 which extends rearwardly from rim 52 along and beyond the periphery of mirror unit 14. Rim 52 includes a recessed interior surface 56 facing the front surface of the mirror unit and defining a channel extending continuously around the undersurface of the rim as shown in FIG. 5. Channel surface 56 receives a bead 74 of sealant to close off, seal and protect the edge of mirror unit 14 as described more fully below. The outer surface of the rim 52 includes a raised ridge or crown 58 intermediate the inner edge 60 and the outer peripheral surface 62. Crown 58 extends around the entire mirror unit on rim 52 and helps provide an aesthetically pleasing appearance minimizing the size of the mirror assembly as explained below. Crown 58 also divides rim 52 into a generally planar, inner surface 64 extending between the crown and inner edge 60 and a generally planar, lateral surface 66 extending between the crown and the outer peripheral surface 62. Peripheral side 54 tapers inwardly toward the rear portion 67 and includes a series of spaced stops or shoulders 68 on its inner surface as are best seen in FIGS. 1-6 and 8. Inner edge 60 of rim 52 includes a planar undersurface 61 (FIG. 7) which contacts the front surface of mirror unit 14 to help provide an environmental seal between the mirror unit and rim as well as to avoid the necessity of molding a knife edge on the rim.

Stop shoulders 68 are spaced rearwardly from the rear surface of mirror unit 14 to allow sufficient room for installation and retention of a retaining plate member 80 (FIGS. 8-12) which holds the mirror unit in place against planar surface 61 and sealant 74 on the underside of rim 52. The shoulders 68 are spaced substantially equally around the bezel to firmly hold the retaining plate 80 in all locations. Each stop shoulder 68 includes an abutment face 70 which extends generally perpendicular to the inner surface of peripheral side 54 and generally parallel to planar surface 61 on rim 52 and to the rear surface of mirror unit 14 when placed in the bezel. In addition, each stop shoulder 68 includes an inclined, ramp surface 72 which extends from the inside surface of rear portion 67 of peripheral side 54 at an inwardly extending angle to the top of abutment surface 70. When retaining member 80 is forced inwardly toward the rear surface of mirror unit 14 during assembly of the mirror, as described below, the outer edge of retaining member 80 will force ramp surfaces 72 outwardly and flex the peripheral side of bezel 12 to allow insertion of the retaining plate behind stop surfaces 70.

Figure 4A:
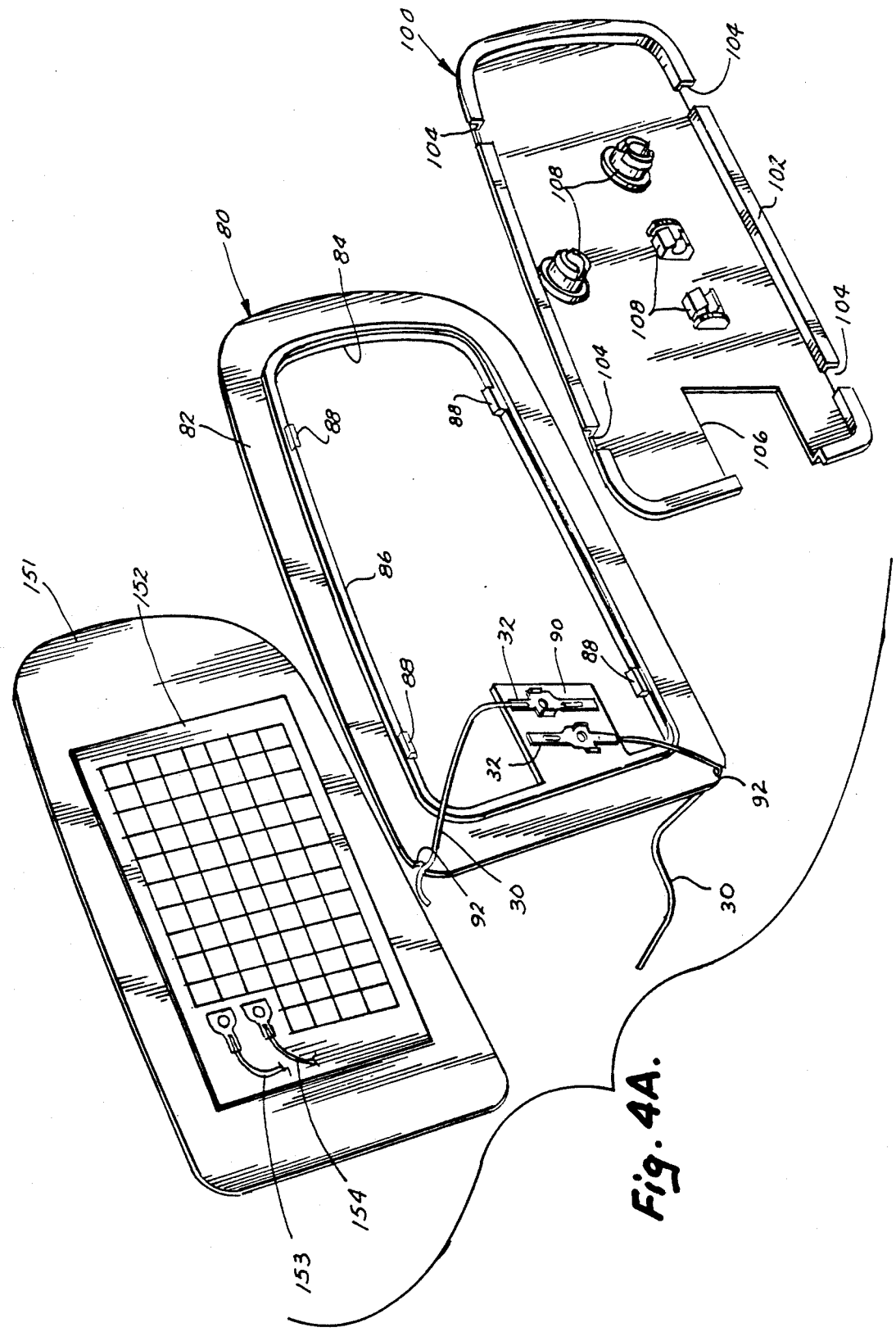
FIG. 4A is an exploded, perspective view similar to FIG. 4 showing the remaining separate components of the mirror assembly of FIGS. 1-3.
Figure 8:
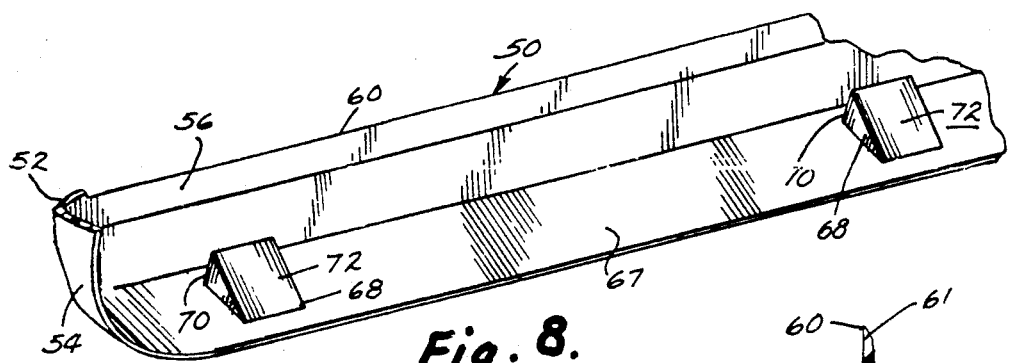
FIG. 8 is a fragmentary, perspective view of a portion of the bezel member of the present mirror assembly.
Figure 7:
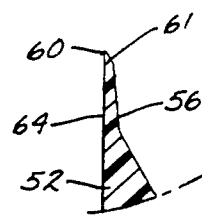
FIG. 7 is a fragmentary, sectional view of the inner edge of the front rim of the bezel of the mirror assembly showing area VII in FIG. 5.
Figure 9:
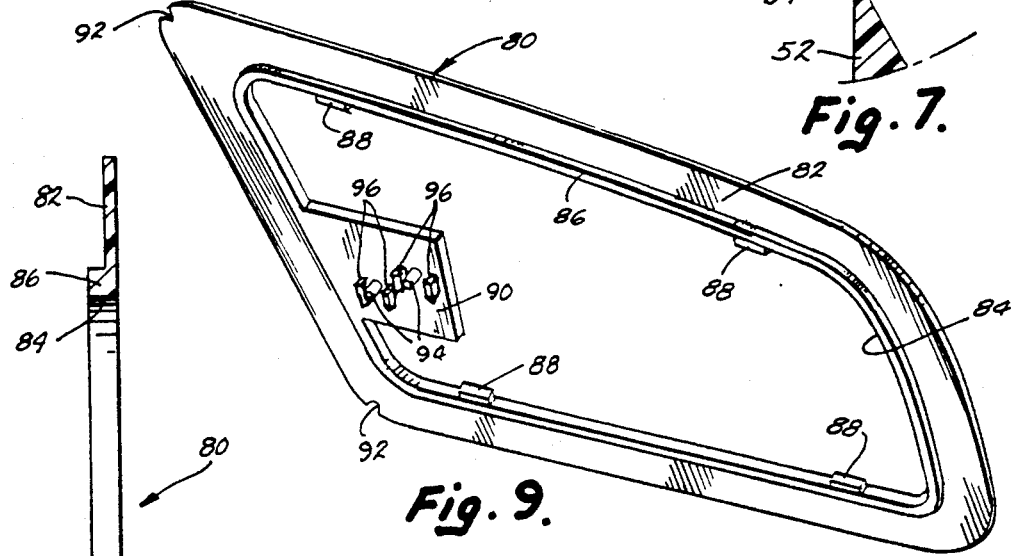
FIG. 9 is a rear perspective view of the retaining member of the present mirror assembly adapted to mate with the bezel member to hold the mirror unit therein.
Figures 10, 11:
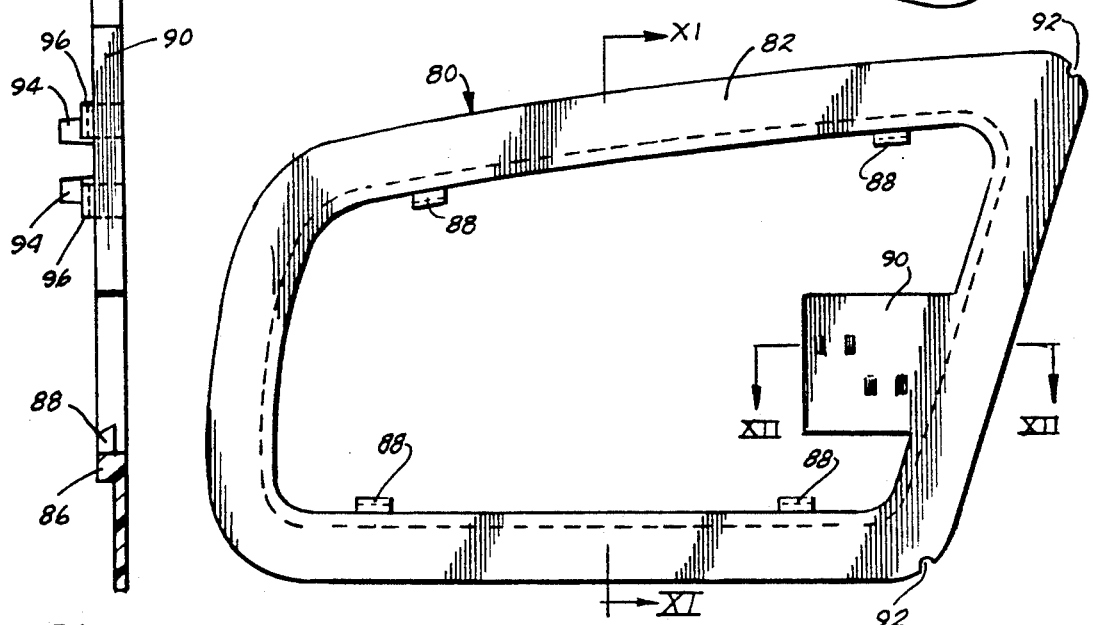
FIG. 10 is a front elevation of the retaining member shown in FIG. 9.
FIG. 11 is a sectional view of the retaining member taken along Plane XI—XI of FIG. 10.
Figure 12:
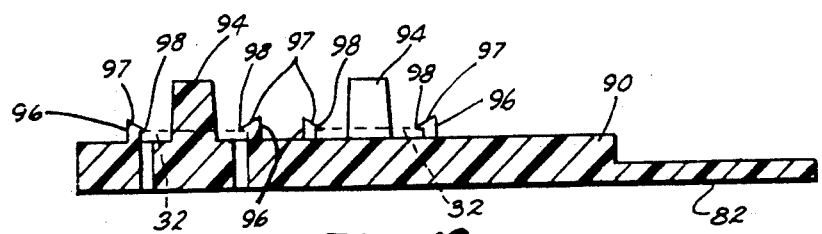
FIG. 12 is a sectional view of the electrical connection mounting portion of the retaining member taken along Plane XII—XII of FIG. 10.

As is best seen in FIGS. 2, 4A, 5 and 9-12, retaining plate member 80 is adapted for use with bezel frame 50 to retain the mirror unit 14 within the bezel 12. Retaining member 80 is a one-piece plate 82 preferably molded from Noryl (T.M.) poly-phenyl-oxide having an exterior outline generally corresponding to the shape of the mirror unit 14 as is shown in FIG. 10. Plate 82 includes a central aperture 84 which also corresponds in shape to the exterior shape of mirror unit 14 but is of a reduced dimension in comparison. Central aperture 84 is outlined by a raised rib 86 which extends continuously around the entire inner edge of the aperture for rigidity and stiffness. At four locations on the top and bottom of plate 82 on rib 86 are formed locating projections 88 which are adapted to mate with corresponding apertures 104 in mounting plate 100 to be described hereinafter. On the inner edge of plate 82 extending inwardly into the opening provided by central aperture 84 and integrally joined with rib 86 is a support pad 90 adapted to receive and mount electrical connectors 32 on electrical leads 30 (FIG. 4A). Once the retaining plate 80 is mounted within bezel frame 50 behind shoulder stops 68 as shown in FIG. 5, the electrical leads 30 must extend through the assembly such that the connectors 32 can be mounted on pad 90. For this purpose, a pair of semicircular recesses 92 are provided at the upper and lower corners of the inside edge of plate 82 to allow passage of wires 30 for attachment of connectors 32 on pad 90.

As is best seen in FIGS. 9-13, support pad 90 includes a series of projections 94, 96 adapted to receive and retain electrical connectors 32 attached to wire leads 30. The projections include a pair of spaced mounting posts 94 and a pair of upstanding retaining clips 96 aligned with one another and spaced adjacent and on either side of each post 94. Each electrical connector 32 has a circular aperture therein which is adapted to be received over post 94. As the electrical connector is pressed down over a post 94, the inclined top surfaces 97 of fastening clips 96 are engaged thereby camming clips 96 slightly apart to allow the connector to slide therepast. Since each of the clips includes an overhanging lip 98 (FIG. 12), the generally planar electrical connector slides past these lips which then snap back over top the connector and hold it securely against the planar surface of pad 90. Alternately, connectors 32 could be secured to support 90 with Tinnerman connectors, heat staked or otherwise securely fastened.

As is best seen in FIG. 4A, retaining plate member 80 is adapted to be used with mounting plate 100 which is preferably molded from plastic such a GTX 910 (T.M.) poly-phenyl-oxide available from G.E. Plastics of Pittsfield, Mass., and includes an outer circumference corresponding in shape to the edge of central aperture 84 in plate 82. Mounting plate 100 includes an offset, outwardly projecting rim 102 which is continuous except for four apertures 104 adapted to receive locating projections 88 to properly position plate 100 within aperture 84 on plate 82. In addition, rim 102 includes a generally rectangular cutout 106 which receives mounting pad 90 for the electrical connectors when plates 82, 100 are fitted together. As will be seen from FIG. 4A, the rear surface of mounting plate 100 includes a series of mounting projections 108 adapted to mate with a control unit or motor unit for supporting the mirror assembly on a vehicle and allowing its position to be controlled remotely from within the vehicle interior. These mounting projections 108 are of conventional form and may be chosen to mate with any of several different types of electrical control motors or manually operated control wires. Thus, mirror assembly 10 may be assembled and shipped to another site where it can be quickly and easily adhered, with a suitable adhesive, to mounting plate 100 which is already assembled to the exterior mirror assembly.

Figure 15:
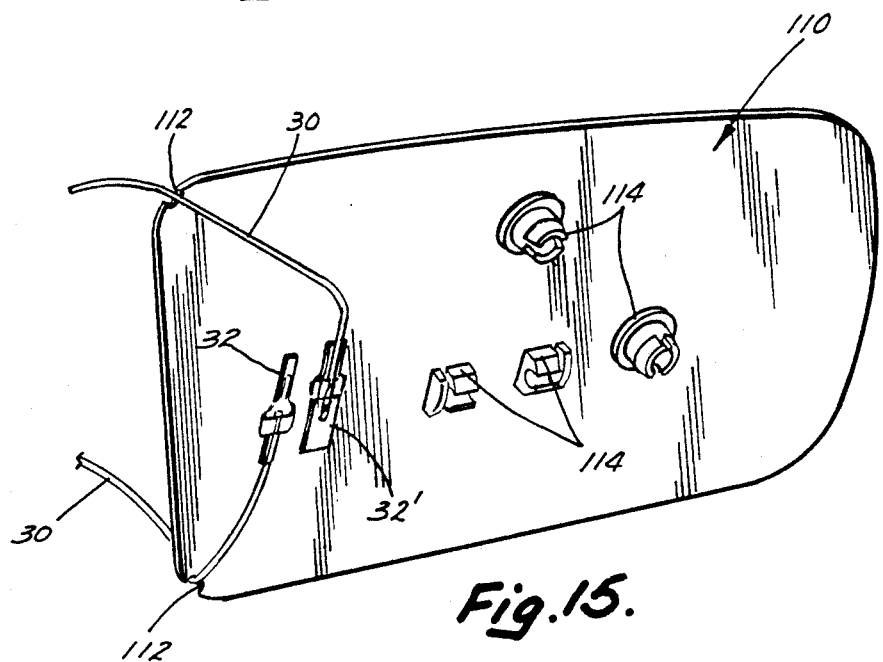
FIG. 15 is a rear perspective view of an alternate form of the retaining member adapted to be used in conjunction with the bezel of the present invention.

Alternately, in place of the two-part retaining plate 80/mounting plate 100 combination, a one-piece generally planar retaining member of plate 110 may be substituted. As shown in FIG. 15, plate 110 is a generally planar, one-piece member also preferably molded from Noryl (T.M.) poly-phenyl-oxide on which are formed projections such as projections 94, 96 in order to hold electrical connectors 32, 32' thereon. In addition, notches 112 are formed in the upper and lower inside corners of plate 110 to allow passage of the electrical wires 30 as described above. Further, mounting projections 114 allow connection of the plate, and thus the entire mirror assembly 10 to an electrical control unit or manually operated control mounted on the vehicle. Plate 110 allows the entire mirror assembly to be secured to the control and mirror mount at one time. Therefore, the two differing forms 80/100 and 110 of the retaining plate allow flexibility in manufacturing options.

With reference to FIGS. 4, 4A, 5 and 5A, assembly of the bezel with the mirror unit will now be understood. Bezel frame 50 is supported horizontally on a support surface with rear portions 67 extending upwardly and the support surface engaging crown 58. A continuous bead of resilient, compressible sealant material is laid in channel 56 on the inside surface of rim 52. Sealant bead 74 has a sufficient size/diameter to extend rearwardly of the planar surface 61 on the inner edge 60 of rim 52 (FIG. 5A). Preferably, the sealant bead is of a type which will flow on surfaces and, when applied, is an uncured material such as a silicone plastic adhesive sold under No. 739 by Dow Chemical Corporation of Midland, Mich. The uncured bead of silicone sealant is allowed to cure in the air at room temperature until it is "tack-free", i.e., not tacky or sticky on its surface. Alternately, other types of silicone sealants or butyl, EPDM or molded neoprene sealants may be used with similar successful results.

Once bead 74 is in a tack-free condition, rear portions 67 of the peripheral side 54 of bezel frame 50 is bent slightly outwardly and mirror unit 14 is placed inside frame 50 such that the front surface of the mirror unit 14 engages bead 74 (FIG. 5A). Frame 50 is of sufficient size to provide a space between the outer peripheral edges of elements 16, 18 (FIGS. 5 and 5A). Wire leads 30 are bent to extend substantially parallel to the peripheral sides 54 and a second bead 76 of the same sealant material, preferably Dow silicone plastic adhesive No. 739, is applied to the rear surface of mirror unit 14 adjacent the peripheral edge of rear element 18 as shown in FIG. 5A. Thereafter, retaining plate member 80, which may include a slanted edge surface 83 to facilitate movement over inclined ramp surface 72, is placed inside bezel frame 50 and pressed against the ramp surfaces 72 of stop shoulders 68 downwardly toward the mirror unit 14. Such pressure cams rear portion 67 of bezel frame 50 outwardly until retaining plate member 82 snaps in place behind the abutment surfaces 70 while also engaging sealant bead 76 on the rear mirror unit surface. Rear portion 67 of bezel frame 50 is sufficiently resilient and flexible to allow such insertion. Pressure of the retaining plate 80 against the sealant bead 76 compresses the sealant into a thinner layer such that it flows both inwardly and outwardly of the peripheral edge of the rear mirror unit surface and slightly into the space adjacent the peripheral edge of the mirror unit as shown in FIG. 5. At the same time, such pressure forces the front surface of mirror unit 14 into engagement with planar surface 61 at the inner edge 60 of rim 52 while compressing sealant bead 74 within channel 56 as shown in FIG. 5. Hence, with retaining plate member 80 held in place by abutment surfaces 70, mirror unit 14 is held securely between the compressed beads of sealant 74, 76 and tightly against the planar surface 61. The resilient, adhesive sealant beads thus seal the edge area of the mirror unit within the imperforate peripheral side of bezel frame 50 forming a continuous sealed, pocket around the mirror unit edge which is protected from the effects of the environment such as moisture, dirt, salt spray, humidity and the like. Since the metallic reflective layer 34 is highly sensitive to such environmental effects, the sealant beads 74, 76 protect that reflective layer as well as the electrical clip and wire connections 28, 30 at the edge of the mirror unit. In addition, the resilient sealant material helps to absorb shock and vibration both during shipment of the mirror assembly to its installation point as well as after assembly when mounted on a vehicle thereby helping to protect the electro-optic mirror unit.

As will also be understood, use of sealant 74, which is air cured to a non-tacky state prior to assembly, allows mirror unit 14 to be disassembled from bezel frame 50 without leaving a residue of sealant on the mirror. Likewise, if mirror assembly 10 must be repaired after manufacture, it can be disassembled to allow replacement or repair of mirror unit 14. This helps reduce costs by allowing re-use of various parts without discarding an entire assembly simply because one part is damaged or inoperative.

Figure 2:
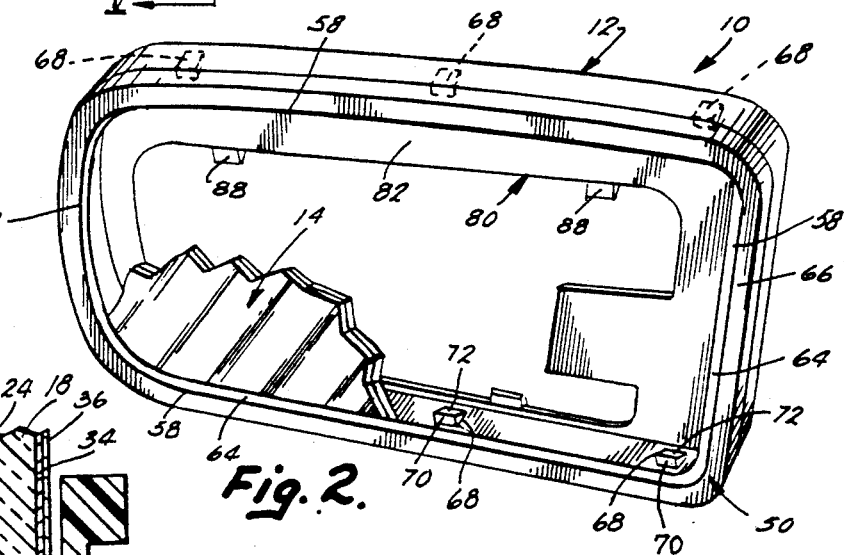
FIG. 2 is a perspective view of the mirror assembly of FIG. 1 with portions of the mirror element broken away.
Figure 6:
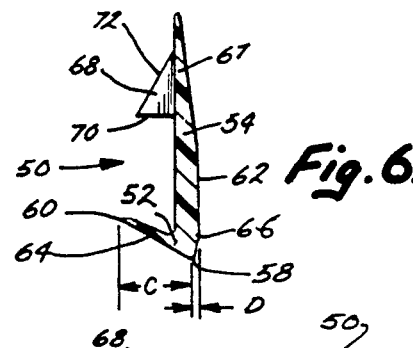
FIG. 6 is a sectional view of the bezel of the mirror assembly taken along Plane VI—VI of FIG. 1.
Figure 3:
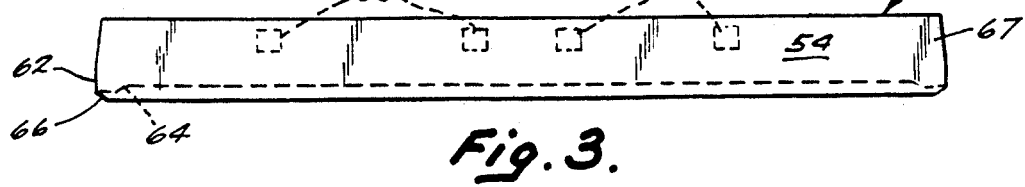
FIG. 3 is a top plan view of the mirror assembly of FIGS. 1 and 2.

When installed on mirror unit 14, bezel assembly 12 also provides unique appearance advantages over prior known bezels, especially for electro-optic mirror units. As is best seen in FIG. 1, the generally vertically extending side portions 52a, 52b of bezel rim 52 are thinner and narrower than the top and bottom portions 52c, 52d of the bezel rim. Since the width of rim 52 need not be as great at the sides where the mirror elements 16, 18 are aligned with one another (see FIG. 4) whereas those same elements are offset from one another at the top and bottoms of the mirror unit as shown in FIGS. 4, 5 and 5A. In addition, the continuous crown 58 which extends around bezel rim 52 helps provide a thinner, narrower appearance for the bezel on the mirror unit, especially when viewed at an angle from the front surface as shown in FIG. 2. Incident light strikes, accents and highlights the crown surface and de-emphasizes the inclined inner and lateral surfaces 64, 66 providing the appearance of a smaller bezel when viewed at such an angle. The position of the crown 58 causes the length projection of the inner surface 64 of the bezel rim (dimension A in FIG. 5) to be greater than the projection of the lateral surface 66 (dimension B) at all positions around the bezel as shown in FIGS. 5 and 6. Thus, with reference to those figures, dimension A is greater than dimension B while dimension C is greater than dimension D. However, along the sides of the mirror, the ratio of C:D is greater than A:B as shown in FIGS. 5 and 6. Also, while the overall width of the bezel is sufficient to accept and cover the necessarily larger sized electro-optic mirror unit edge including electrical connections, the appearance from the front is of a thinner bezel providing a more appealing appearance to the consumer. In addition, the height of crown 58 projects as little as possible beyond the front surface of the mirror unit Accordingly, together, thinner sides 52d, 52b and positioning of the raised ridge or crown 58 minimize the size of the bezel 12 in appearance.

Figure 13:
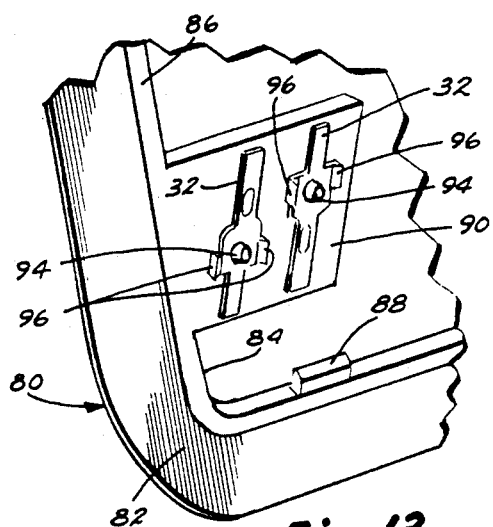
FIG. 13 is a fragmentary, perspective view of the electrical connection mounting area of the retaining member.

After the retaining plate 80 or 110 is positioned behind stop members 68, with wire leads 30 extending through notches 92 or 112, electrical connectors 32 may be snapped in place over mounting post 94 between clips 96. As shown in FIGS. 4A, 13 and 15, however, electrical connectors 32 which are of opposite polarity in order to allow proper operation of the electro-optic mirror unit 14, are positioned in opposite directions from one another on support pad 90 or retaining plate 110. The opposite positioning of the electrical connector is adapted to prevent incorrect polarity connections from the vehicle electrical system. For example, wire leads from the electrical system of the vehicle are preferably made of different lengths so that a short lead having a corresponding electrical connectors to spay connector 32 may only be attached to one or the other of the electrical connectors 32 while a longer wire lead from the vehicle electrical system may be reversed in direction and attached to the other connector. Hence, because of the physical dimensions of the leads from the vehicle system, and the opposite positioning of connectors 32, installation with incorrect polarity connections to the mirror unit 14 are avoided.

Alternately, as shown in FIG. 15, electrical connectors 32 may be made of different sizes or dimensions so that correspondingly sized connectors from the vehicle electrical system can only be attached to the appropriately matched electrical connector on the rear of the mirror assembly. Again, incorrect polarity connections, and thus damage or destruction of the polarity sensitive mirror unit 14, are avoided.

Figure 14:
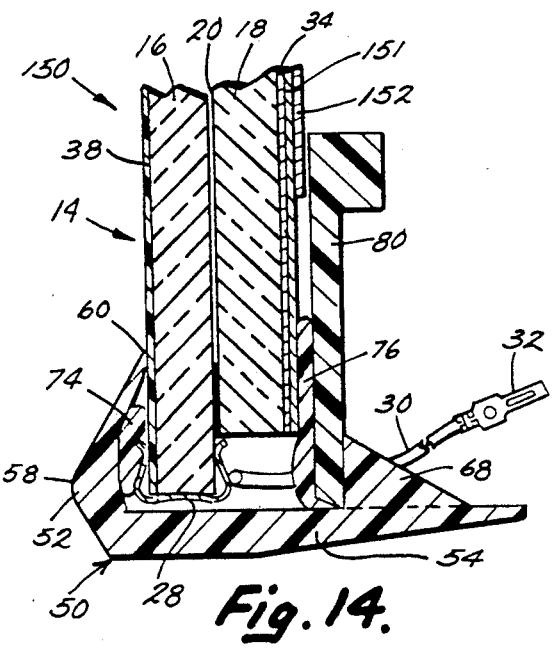
FIG. 14 is a fragmentary, sectional view of an alternate form of the rearview mirror assembly of the present invention including an electrical heating pad/element on the rear surface of the mirror unit.

As shown in FIGS. 4A and 14, an alternate mirror assembly 150 may incorporate one of various types of heating elements or pads 152 applied to the rear surface of mirror unit 14. In assembly 150, where like numerals indicate like parts to those described above, mirror unit 14 is assembled within bezel 12 using sealant beads 74, 76 and rear retaining plate member 80 as in mirror assembly 10. However, prior to such assembly, a thin sheet of aluminum foil 151 followed by a heating pad such as that shown at 152 in FIG. 4A are applied to the rear surface of the mirror unit by silicone or other appropriate adhesives. Foil sheet 151 helps conduct heat uniformly over the entire mirror unit from pad 152. Also, sheet 151 eliminates the need for anti-scatter layer 36 since it is adhered tighly to rear element 18 and itself produces a fragment retention, anti-scatter function in the event mirror unit 14 is impacted. Heater pad 152 preferably is a positive temperature coefficient pad available from ITW Chronomatic of Chicago, Ill. under Model No. D9968 and is die cut to the shape of the mirror unit or to a rectangular or trapezoidal shape. Sheet 151 of aluminum foil preferably has a thickness of approximately 0.017 inches and is supplied by 3M Corporation of Minneapolis, Minn. under Part No. M6169. The thickness may be varied depending on desired heating speed, i.e. thinner for increased heating speed. Electrical leads 153 154 are secured to heater pad 152 and extended along the back of the mirror unit through the sealant bead 76 and out through notches 92 or 112 along with electrical leads 30 from mirror unit 14. Since the voltage required for operation of heater pad 152 is typically higher than that needed for mirror unit 14, different size leads and different type electrical connectors are used for heater pad 152 to avoid misconnection. Alternately, separate apertures through the center mounting plate 100 or retaining plate 110 may be provided for leads 153, 154. As shown in FIG. 14, sufficient space between the inside surface of retaining plate 80, 110 and the rear surface of mirror unit 14 is provided to allow use of a heater pad 152 as described above. If desired, heater pad 152 may be directly adhered to the back of rear element 18 over reflective layer 34 without including foil sheet 151. In such case, pad 152 is die cut to match the shape of mirror element 18. When operated, the heating pad 152 provides electrical resistance heating for the rear element 18 which, by conduction, is also carried to front element 16 for defrosting and de-icing purposes on mirrors used in colder climates.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows.

1. A rearview mirror assembly for vehicles comprising:
    a rearview mirror including a mirror element having front and rear surfaces and peripheral top, bottom and opposing end edges and a reflective coating on one of said front and rear surfaces;
    a bezel surrounding and holding said mirror and having a rim engaging said front surface of said mirror, a peripheral side adjacent said peripheral edges of said mirror, and means for holding said mirror within said bezel; and
   mounting means for connection to a mirror support;
   said bezel rim including a crown extending around the entire bezel and an inner edge engaging said front of said mirror, said crown being spaced inwardly toward said inner edge from said peripheral side and dividing said rim into an inner surface sloping from said crown to said inner edge and a lateral surface sloping from said crown toward said peripheral side of said bezel whereby when viewed from said front of said mirror at an angle, said bezel appears thinner than its full width due to light accenting said crown and deemphasizing said inner rim surface.

2. The mirror assembly of claim 1 wherein the projection of said inner surface has a length greater than the length of the projection of said lateral surface.

3. The mirror assembly of claim 2 wherein said crown is formed by a relatively sharp edge between said inner surface and said lateral surface along each of said peripheral opposing end edges of said mirror, said crown having a more rounded configuration along said peripheral top and bottom edges of said mirror.

4. The mirror assembly of claim 2 wherein the ratio of said length of said inner surface projection to said length of said lateral surface projection is greater along said peripheral opposing side edges of said mirror than along said peripheral top and bottom edges.

5. The mirror assembly of claim 1 wherein said bezel rim has a recessed undersurface forming a channel extending around said rim, said channel adapted to receive a seal material for providing an environmental seal around the peripheral edges of said mirror when said bezel receives said mirror.

6. The mirror assembly of claim 5 wherein said inner edge of said bezel rim includes a generally planar undersurface engaging said front surface of said mirror.

7. The mirror assembly of claim 1 wherein said inner surface is substantially planar.

8. The mirror assembly of claim 7 wherein said lateral surface is substantially planar.

9. The mirror assembly of claim 1 wherein said inner edge of said bezel rim includes a generally planar undersurface engaging said front surface of said mirror.

10. The mirror assembly of claim 1 wherein said lateral surface is substantially planar.

11. The mirror assembly of claim 1 wherein said crown is formed by a sharp edge between said inner surface and said lateral surface along each of said peripheral opposing end edges of said mirror, said crown having a more rounded configuration along said peripheral top and bottom edges of said mirror.

12. A rearview mirror assembly for vehicles comprising:

a rearview mirror including a mirror element having front and rear surfaces and peripheral top, bottom and opposing end edges and a reflective coating on one of said front and rear surfaces;

a bezel surrounding and holding said mirror and having a rim engaging said front surface of said mirror, a peripheral side adjacent said peripheral edges of said mirror, and means for holding said mirror within said bezel; and mounting means for connection to a mirror support;

said bezel rim having a first width along said front mirror surface adjacent said top and bottom edges, the width of said bezel rim along said opposing end edges being less than said first width whereby when viewed at an angle from the front and adjacent one end, said bezel appears smaller at said end edges of said mirror thereby deemphasizing the size and appearance of said bezel on said assembly.

13. A rearview mirror assembly for vehicles comprising:

a rearview mirror including a mirror element having front and rear surfaces and peripheral top, bottom and opposing end edges and a reflective coating on one of said front and rear surfaces;

a bezel surrounding and holding said mirror and having a rim engaging said front surface of said mirror, a peripheral side adjacent said peripheral edges of said mirror, and means for holding said mirror within said bezel; and mounting means for connection to a mirror support;

said bezel rim having a first width along said front mirror surface adjacent said top and bottom edges, the width of said bezel rim along said opposing end edges being less than said first width whereby when viewed at an angle from the front and adjacent one end, said bezel appears smaller at said end edges of said mirror thereby deemphasizing the size and appearance of said bezel on said assembly;

said bezel rim including a crown extending around the entire bezel and an inner edge engaging said front of said mirror, said crown being spaced inwardly toward said inner edge from said peripheral side and dividing said rim into an inner surface sloping from said crown to said inner edge and a lateral surface sloping from said crown toward said peripheral side of said bezel whereby when viewed from said front of said mirror at an angle, said bezel appears thinner than its full width due to light accenting said crown and deemphasizing said inner rim surface.

14. The mirror assembly of claim 13 wherein the projection of said inner surface has a length greater than the length of the projection of said lateral surface.

15. The mirror assembly of claim 13 wherein said bezel rim includes an undersurface which is recessed forming a channel extending around said rim, said channel adapted to receive a seal material for providing an environmental seal around the peripheral edges of said mirror when said bezel receives said mirror.

16. The mirror assembly of claim 13 wherein said inner edge of said bezel rim includes a generally planar undersurface engaging said front surface of said mirror.

17. The mirror assembly of claim 13 wherein said inner surface is substantially planar.

18. The mirror assembly of claim 17 wherein said lateral surface is substantially planar.

19. A rearview mirror assembly, especially for use on the exterior of a vehicle, comprising:

a rearview mirror having front, rear and peripheral edge surfaces and including a mirror element having a reflective coating thereon;

a bezel surrounding said mirror and having a rim engaging said front surface of said mirror and an imperforate peripheral side adjacent said peripheral edge surface of said mirror; said rim having an undersurface facing said mirror;

a retaining member adjacent said rear surface of said mirror and engaging said bezel for holding said mirror within said bezel, said retaining member having an inner surface facing said mirror;

cooperating means on said bezel and retaining member for holding said retaining member and bezel together;

mounting means for connection to a mirror support; and seal means within said bezel and retaining member for sealing said peripheral edge surface of said mirror, said seal means including a first resilient compressible seal member extending around the entirety of said mirror adjacent said mirror peripheral edge surface and intermediate said rim undersurface and said mirror front surface and a second resilient compressible seal member extending around the entirety of said mirror adjacent said mirror peripheral edge surface and intermediate said retaining member inner surface and said mirror rear surface, said seal members and the inner surface of said peripheral side of said bezel defining a generally open pocket adjacent said peripheral edge surface of said mirror around said mirror, said pocket being sealed environmentally to protector said peripheral edge surface including the peripheral edge of said reflective coating against environmental conditions and effects such as dirt, water, salt spray, humidity and corrosion, said first seal member resiliently urging said mirror rearwardly against said second seal member and retaining member to ensure a secure environmental seal and to hold said mirror tightly and cushion said mirror against vibration and shock.

20. The mirror assembly of claim 19 wherein said mirror is an electro-optic mirror unit having at least one transparent panel, an electro-optic material adjacent said panel, electrical means for applying electrical power to said electro-optic material to vary the light transmittance of said material, and a reflective layer for reflecting light incident thereon through said material.

21. The mirror assembly of claim 20 wherein said electro-optic material is an electrochromic medium.

22. The mirror assembly of claim 20 wherein said electrical means include electrical connections secured to the periphery of said mirror unit within said pocket; said seal members protecting said electrical connections against corrosion, shorting and other environmental effects.

23. The mirror assembly of claim 19 wherein at least said first seal member is formed from a seal material which is substantially cured to a non-tacky, non-adhesive state prior to assembly with said mirror whereby said mirror may be disassembled from said bezel for removal or re-adjustment of position without adherence of said first seal member to said mirror.

24. The mirror assembly of claim 23 wherein said undersurface of said bezel rim is recessed thereby forming a channel extending around said rim, said channel receiving said first seal member, said first seal member being applied within said channel and projecting out of said channel for contact with said mirror front surface prior to assembly of said bezel with said mirror.

25. The mirror assembly of claim 19 wherein said retaining member is a plate having a peripheral edge; said cooperating means including spaced shoulders on said bezel peripheral side and a ramp surface leading to each of said shoulders; said peripheral edge of said plate adapted to engage said ramp surfaces and resiliently urge said bezel peripheral side outwardly so as to snap behind said shoulders against said second seal member on said mirror rear surface when pressed toward said mirror during assembly; said bezel peripheral side being sufficiently resilient to flex outwardly when said ramp surfaces are engaged by said peripheral edge of said plate.

26. The mirror assembly of claim 25 wherein said plate includes a rear surface;

said assembly including connecting means for electrical connections to said mirror on said rear surface of said plate.

27. The mirror assembly of claim 26 wherein said plate includes an opening therethrough, said opening having an edge; said mounting means including a second plate having connections to a mirror support joined to said edge of said opening through said plate.

28. The mirror assembly of claim 26 wherein said mounting means includes a second plate having connections to a mirror support joined to said plate.

29. The mirror assembly of claim 25 including heating means on said rear surface of said mirror intermediate said plate member and said mirror.

30. The mirror assembly of claim 19 including heating means on said rear surface of said mirror intermediate said retaining member and said mirror.

31. A rearview mirror assembly for vehicles comprising:

an electro-optic mirror unit having front, rear and peripheral edge surfaces and including at least one optically clear panel, an electro-optic material adjacent said panel, electrical means for applying electrical power to said electro-optic material to vary the light transmittance of said material, and a reflective layer for reflecting light incident thereon through said material, said mirror unit also including a pair of electrical connections to said electrical means;

a bezel surrounding and holding said mirror unit and having a rim engaging said front surface of said mirror unit, a peripheral side adjacent said peripheral edge surface of said mirror unit, and means for holding said mirror unit within said bezel; and mounting means for connection to a mirror support;

said bezel including a support for mounting said pair of electrical connections for connection to a vehicle electrical system; said pair of electrical connections having opposite polarities and mounted on said support and including means for preventing incorrect polarity connections to the vehicle electrical system.

32. The mirror assembly of claim 31 wherein said means for holding said mirror unit within said bezel include a retaining member adjacent said rear mirror surface and spaced shoulder means on said bezel for holding said retaining member on said bezel, said retaining member including apertures therethrough allowing passage of said electrical connections from said electrical means.

33. The mirror assembly of claim 32 wherein said retaining member includes said support for mounting said pair of electrical connections.

34. The mirror assembly of claim 31 wherein said means for preventing incorrect polarity connections to the vehicle electrical system include said pair of electrical connections being mounted to extend in different directions on said support, each connection adapted to mate with an electrical connection of the same polarity on a electrical lead having a length preventing attachment to said differently directed, opposite polarity, electrical connection on said support.

35. The mirror assembly of claim 31 wherein said means for preventing incorrect polarity connections to the vehicle electrical system include said pair of electrical connections each having a different size/dimension adapted to mate with a correspondingly sized connection of the same polarity from the vehicle electrical system.

* * * * *